US008963451B2

(12) United States Patent
Altheimer et al.

(10) Patent No.: US 8,963,451 B2
(45) Date of Patent: Feb. 24, 2015

(54) AC/DC CONVERTER HAVING A SWITCHABLE PFC, A CONTROLLER THERFOR, AND A METHOD OF OPERATING A CONTOLLER

(75) Inventors: Michel Altheimer, Hermanville sur mer (FR); Christophe Delcourt, Saint Contest (FR); Frederic Mercier, Saint Manvieu-Norrey (FR)

(73) Assignee: NXP B.V., Eindhoven (NL)

( * ) Notice: Subject to any disclaimer, the term of this patent is extended or adjusted under 35 U.S.C. 154(b) by 233 days.

(21) Appl. No.: 13/599,061

(22) Filed: Aug. 30, 2012

(65) Prior Publication Data
US 2013/0057170 A1 Mar. 7, 2013

(30) Foreign Application Priority Data

Sep. 1, 2011 (EP) .................................... 11290386

(51) Int. Cl.
*H05B 37/02* (2006.01)
*H02M 1/42* (2007.01)
*H02M 1/00* (2006.01)

(52) U.S. Cl.
CPC .... *H02M 1/4208* (2013.01); *H02M 2001/0032* (2013.01); *H02M 2001/007* (2013.01); *Y02B 70/126* (2013.01); *Y02B 70/16* (2013.01)
USPC .......................................... 315/308; 315/291

(58) Field of Classification Search
USPC ...... 315/209 R, 224–226, 291, 307, 308, 312
See application file for complete search history.

(56) References Cited

U.S. PATENT DOCUMENTS

| 6,222,746 | B1 | 4/2001 | Kim |
| 6,903,536 | B2 | 6/2005 | Yang |
| 7,452,248 | B2* | 11/2008 | Seo et al. ...................... 439/751 |
| 2005/0099164 | A1 | 5/2005 | Yang |
| 2005/0128773 | A1 | 6/2005 | Yang |
| 2009/0091957 | A1* | 4/2009 | Orr et al. ......................... 363/79 |

FOREIGN PATENT DOCUMENTS

CN 100539367 C 9/2009
EP 1 176 705 A1 1/2002

OTHER PUBLICATIONS

IEC; "International Standard IEC 61000-3-2, Edition 3.2"; 36 pages (Apr. 2009).
Extended European Search Report for European Patent Appln. No. 11290386.9 (Apr. 4, 2012).

* cited by examiner

*Primary Examiner* — Jimmy Vu

(57) ABSTRACT

A method of controller an AC/DC to converter is disclosed, the converter having a power factor correction stage and a signal indicative of a required power and operating with a switching cycle having a switching frequency being the inverse of a switching period. The method comprises switching on the PFC stage, in response to a signal indicative of an average switching frequency rising above a first threshold. The method further comprises switching off the PFC stage, in response to the signal indicative of an average switching frequency falling below a second threshold. The method may further comprise switching on the PFC stage, in response to a positive step change in the signal indicative of a required power, and switching off the PFC stage, in response to indicative step change in the signal indicative of a required power. A controller and an AC/DC converter operable according to such a method are also disclosed as is an LED lighting system comprising such a controller.

13 Claims, 3 Drawing Sheets

AC/DC CONVERTER HAVING A SWITCHABLE PFC, A CONTROLLER THERFOR, AND A METHOD OF OPERATING A CONTOLLER

CROSS-REFERENCE TO RELATED APPLICATIONS

This application claims the priority under 35 U.S.C. §119 of European patent application no. 11290386.9, filed on Sep. 1, 2011, the contents of which are incorporated by reference herein.

FIELD OF THE INVENTION

This invention relates to AC/DC converters, controllers therefor, and to methods of controlling a AC/DC converters.

BACKGROUND OF THE INVENTION

Since switched mode AC/DC converters do not draw only real power uniformly from the power supply, there is a tendency for them to introduce harmonic distortion into the mains supply. Because some of the power drawn is so-called imaginary power, in other words the voltage and current are in quadrature, the power factor of AC/DC converters is less than unity. For high power converters the distortion on the mains can be significant, and this can be detrimental to the supply network; as a result in some jurisdictions regulation has been introduced, such as EN 61000-3-2 in Europe, to limit the mains distortion.

In order to ensure a high power factor, and to comply with such regulation, it is increasingly common to integrate a power factor correction stage within an AC/DC converter. However, since the distorting effect of non-unity power factor is lower for lower drawn mode, the PFC may not be required for low loads, and it is thus known to disable the PFC stage for low load operation. An example of a controller for an AC/DC converter with a switchable PFC stage (that is to say, a PFC stage which may be enabled or disabled) is TEA175x range of products available from NXP Semiconductors®. The enabling and disabling of the PFC stage, in known controllers, is determined by the status of the output power of the controller, which is monitored by means of the power control pin of the controller. The power control pin indirectly senses the output power provided by the converter, typically by means of an isolating opto-coupler which senses the output power (at the secondary side) and passes this information through the isolation of the opto-coupler to the primary side specifically to a control pin of the controller.

However, this arrangement is not ideal because the voltage on the power control pin tends to be noisy and is relatively unstable, which may result in inappropriate enabling or disabling of the PFC stage in order to accommodate this, switching thresholds for the PFC stage, at which the PFC is enabled or disabled, may be set to non-ideal values.

SUMMARY OF THE INVENTION

It is an object of the present invention to provide a relatively robust method of enabling and disabling a PFC stage of an AC/DC converter. It is a further object to provide a controller for operating such a method, and an AC/DC converter comprising such a controller.

According to a first aspect there is provided a method of controlling an AC/DC converter, the converter having a power factor correction stage and a signal indicative of a required power and operating with a switching cycle having a switching frequency being the inverse of a switching period, the method comprising: enabling the PFC stage, in response to a signal indicative of an average switching frequency crossing a first threshold (Vref-on); and disabling the PFC stage, in response to the signal indicative of an average switching frequency oppositely crossing a second threshold (Vref-off). It will be appreciated that "oppositely crosses" is synonymous with "crosses in the opposite direction". Thus, the PFC stage may be enabled in response to the signal rising above the first threshold and disabled in response to the signal falling below the second threshold; conversely, the signal may be a inverted relative to that just described, such that the PFC stage is enabled in response to the signal falling below the first threshold and disabled in response to the signal rising above the second threshold.

In embodiments, the second threshold is different from the first threshold. Hysteresis between enabling the PFC, and disabling it, may thereby be provided. In the case that a rising signal enables the PFC and a falling signal disables it, the first threshold is thus higher than the second threshold; conversely, in the case that a rising signal disables the PFC and a falling signal enables it, the first threshold is thus lower than the second threshold.

In embodiments, the method further comprises: enabling the PFC stage, in response to the signal indicative of a required power exceeding a first predetermined level (Vstep). Thus, the enabling of the PFC may be forced upon a step-change, that is to say a fast and significant change, in the load on the AC/DC converter. The relative slow response of the averaging function, to step-changes in the load, can thereby be overcome. In embodiments, the step-change is measured by a Schmitt trigger.

The PFC stage may be a separate stage in the AC/DC converter. Alternatively, the PFC stage may be integral with another stage of the converter.

The AC/DC converter may be a flyback converter. Alternatively, the AC/DC converter may be another type of converter.

In embodiments, the signal indicative of an average switching frequency is proportional to a sum, over a plurality of switching cycles, of the difference between the switching period of that switching cycle and a reference period (T_PFC-on, T_PFC-off). In embodiments, the signal indicative of an average switching frequency is the voltage across a capacitor, which, for each switching period, is charged at a predetermined charge rate (I) for half the reference period, and discharged at the predetermined rate for the remaining of the switching period.

According to another aspect, there is provided a controller for a AC/DC converter, operable with a switching cycle having a switching frequency being the inverse of a switching period, the controller comprising: a switchable PFC stage, wherein the controller is configured to enable the PFC stage, in response to a signal indicative of an average switching frequency crossing a first threshold (Vref-on); and to disable the PFC stage, in response to the signal indicative of an average switching frequency oppositely crossing a second threshold (Vref-off);

In embodiments, the controller is further configured to enable the PFC stage, in response to the signal indicative of a required power exceeding a first predetermined level (Vstep). Thus, the relative slow response of the averaged frequency signal, to step-changes in the load, may be by-passed, and the PFC may be forced on, upon the occurrence of such a step change.

In embodiments, the converter further comprises a Schmitt Trigger configured to determine the step-change. In embodiments, the converter comprises a timer, and an integrator configured to output the signal indicative of an average switching frequency. The integrator may comprise a capacitor, configured to, in use during a switching cycle, be charged with a current for half a reference period, and be discharged with that current for the remainder of the switching period of that switching cycle.

According to a yet further aspect, there is provided an LED lighting system comprising an AD/DC convertor comprising a controller as just described.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
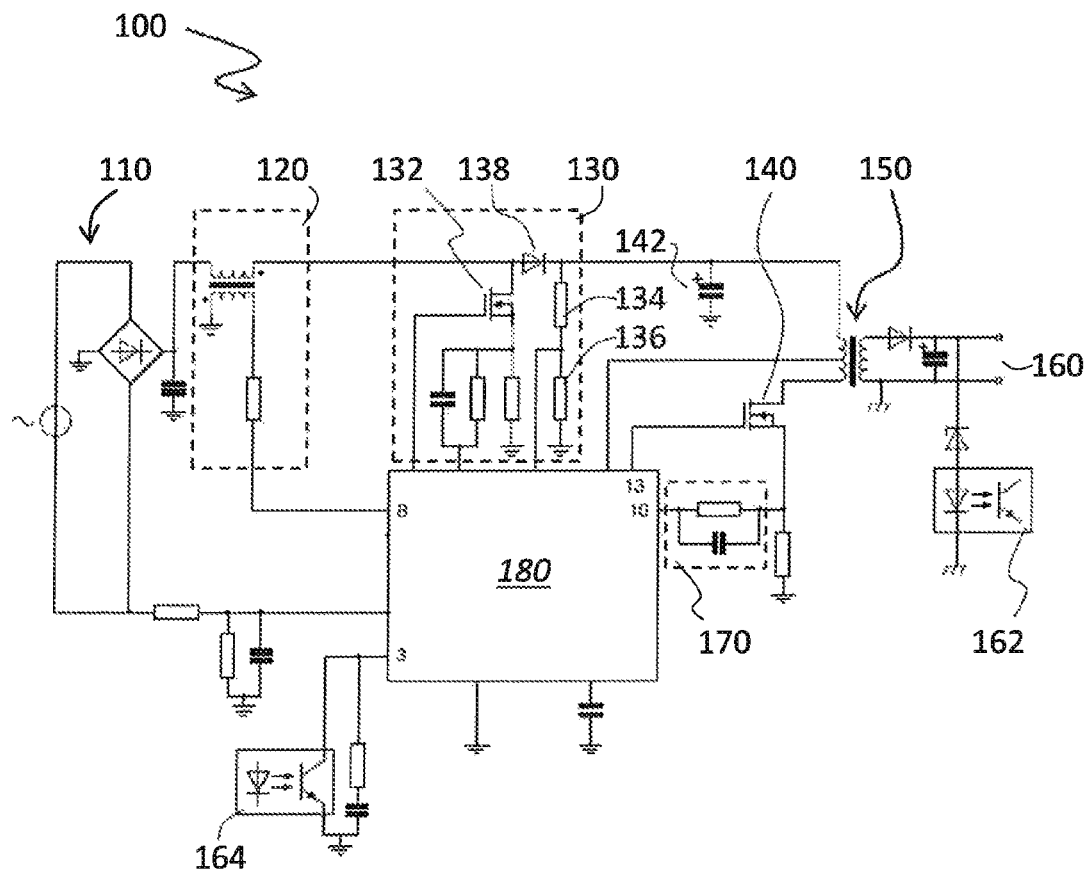
FIG. 1 is schematic of an AC/DC converter.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

FIG. 1 is schematic of relevant parts of an AC/DC converter. The AC/DC converter shown is a flyback converter 100, although it will be appreciated that the invention is not limited thereto, but may also be applied to other converters in which the power is modulated by or varies according to a switching frequency. The converter has an input stage 110 for an alternating current mains input; the input stage 110 is connected to a PFC stage 120, which is driven by means of a switch 132 shown in block 130. A resistive divider, comprising resistors 134 and 136, is connected after a diode 138 and is used to sense the voltage across a capacitor 142 which is connected in series with the switch 132, and to regulate the on time of the PFC stage. A power switch 140 for the flyback converter controls the current through the primary coil on the input side of a transformer 150. The secondary side of the transformer 150 is connected to the output 160 by means of a diode and smoothing capacitor. As the skilled person will be aware, the transformer may have auxiliary coils—for the sake of clarity these are not shown. The voltage on the output 160 is sensed at one side 162 of an opto-coupler, that is to say at the opto-coupler input side. The other side, that is to say the output side 164 of the opto-coupler, is connected to a sense pin (shown as pin 3) of a controller 180, which is typically implemented as an integrated circuit. Thus the opto-coupler provides feedback from the secondary or output side of the converter to its primary or input side, and provides a power control signal, which is derived from the output of the converter. In other converters, an opto-coupler is not used, but the power control signal is otherwise provided to the controller, for instance by an indirect measurement, or an emulation of the output power. The voltage at the switch 140 is sensed by sensing circuit 170, which is connected to another pin (shown as pin 10) of the controller 180. Finally, the controller 180 drives the power switch 140 by means of a signal on a yet further pin (shown as pin 13) of the controller. The skilled person will appreciate that the flyback converter 100 may include other circuit blocks and functionalities, such as will be well known in the art, and which for the sake of clarity and brevity are not repeated herein.

In known converters, the voltage on the power control pin, that is to say the voltage on the output of the opto-coupler connected to pin 3 of controller 180, is used to enable or disable the PFC stage 120. The PFC stage is enabled or disabled by means of its power switch 132, which is controlled by the controller 180. To disable the PFC stage, the switch 132 is set to be permanently closed; to enable the PFC stage, the switch is regulated by pulse width modulation (PWM), as will be well known to the skilled person. However, as mentioned hereinabove, the signal at pin 3 is prone to be a noisy signal: in particular it is prone to ground noise due to the switching of switch 140. Moreover there is another source of noise on this signal: for improved efficiency and to minimise switching losses, switching is normally affected in a valley (so-called zero current switching or ZCS). In situations where the "ideal" switching moment does not correspond to a specific Valley, it is common for the switching to oscillate between neighbouring valleys on alternate switching cycles. The frequencies corresponding to neighbouring valleys may be up to typically 15 kHz difference. The signal on the power control pin 3 may vary with this instantaneous change in frequency, resulting an unwanted enabling and/or disabling of the PFC controller.

According to embodiments, control to enable or disable the PFC stage is not provided from the power control pin which depends from the output power, but rather is provided directly from the frequency control of the convertor, in converters where the frequency is or may be used to control the operation of the converter.

Figure 2:
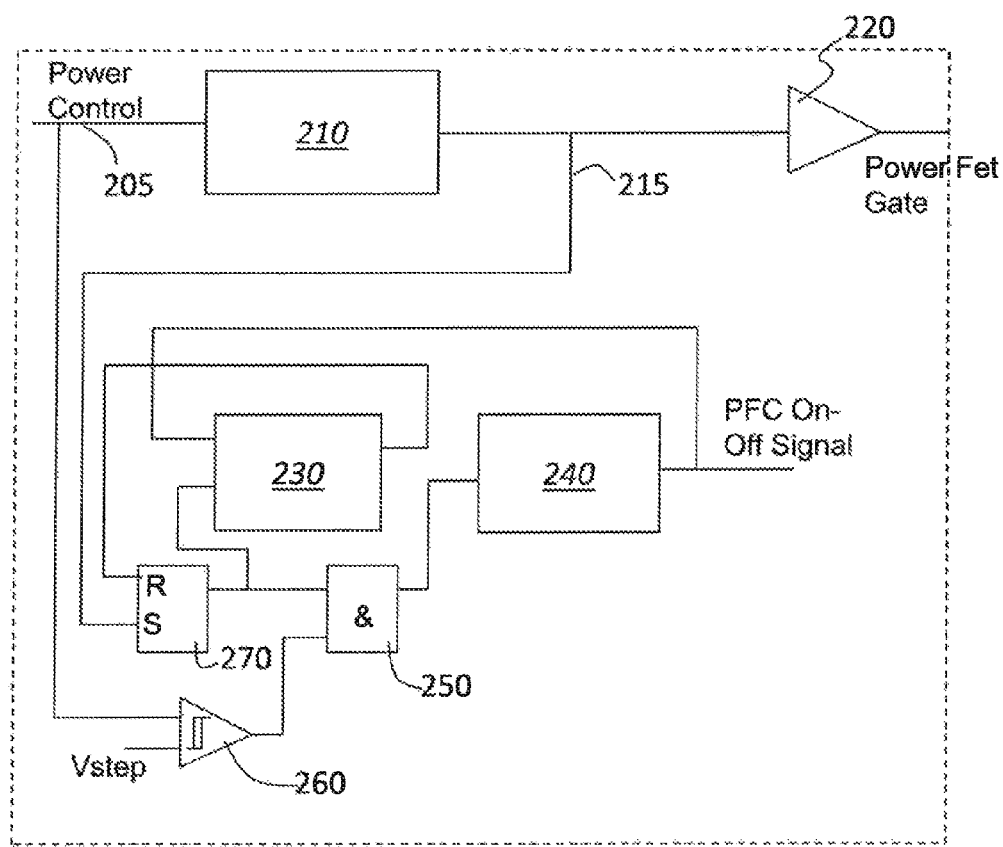
FIG. 2 is a block diagram of a control circuit according to embodiments.

FIG. 2 is a block diagram of a control circuit according to embodiments. This figure shows the power control signal 205, (that is to say the signal on pin 3 of the controller of FIG. 1) routed to a converter controller 210, which controls a gate driver circuit 220, to provide the drive signal on the gate of the power switch 140 which is typically, but not necessarily, a power-FET. However, the primary control for enabling and disabling the PFC stage (that is, the PFC On-Off signal) is not taken from the power control signal 205, as would be the case for conventional PFC control circuits, but rather from the input of the converter controller 220, that is to say from the driver signal 215, which gives an indication of the actual frequency of the converter. This driver signal is averaged or smoothed, and the average value of the frequency is used to control the PFC on-off signal. As will be discussed in more detail hereinbelow, the average is determined by means of a timer 230 and an integrator 240, together with an RS (reset-set) latch 270. The timer provides measurement of the actual frequency; the integrator averages the measured frequency, and the latch starts and stops the timer.

In some implementations, as will be discussed in more detail hereinbelow in relation to FIG. 3, the timer is started by the rising edge of the driver signal 215. All the while the timer 230 is activated, a capacitor is charged by a current "I" in the integrator. Once the timer 230 reaches half a threshold period, the timer is reset, by means of the SR latch 270 which resets, and thereafter the capacitor is discharged by the same current "I". The discharging is stopped by the next rising edge of the converter drive signal 215, which also sets the latch 270.

In the cases that the charging time is greater than the discharging time, which case corresponds to the converter frequency being higher than the threshold frequency, the voltage on the integrator capacitor increases. Conversely if the charging time is less than the discharging time, the voltage on the integrator capacitor decreases (ignoring for the moment the situation in which the capacitor is fully charged or discharged—this will be considered in more detail below). If, on average, the charging time is greater than the discharging time, the voltage on the integrator will rise and at some moment pass a threshold level. Once this threshold level is reached (or passed, depending on the exact implementation), the PFC is switched on. Thus, the circuit described so far based around the timer, integrator, and latch has the effect of enabling (or switching on) the PFC if an average frequency of the converter is greater than a first threshold frequency.

The skilled person will appreciate that as used herein, the term "average" is to be construed in a broad sense and is not limited to an average over a fixed or predetermined number of cycles. In other words, average should not be construed as to be synonymous with "moving average". Provided only that the sum, over an arbitrary number of switching cycles starting from a latch "set" condition—which will be described in more detail here below—of the difference between the charge and discharge amount of electrical charge during any switching cycle, reaches a first predetermined level, then the PFC will be enabled. Similarly, as will be discussed below, provided only that the sum, over an arbitrary number of switching cycles starting from a capacitor reset condition of the difference between the charge and discharge amount of electrical charge during any switching cycle, reaches a second predetermined level, then the PFC will be disabled After the PFC is enabled, the threshold voltage level, which corresponded to the first predetermined level may be altered to a second predetermined level which conveniently may be lower than the first predetermined level. In this way, hysteresis is provided to "bouncing" between enabled and disabled PFC states is avoided, since a slight fall in the voltage will not reset the PFC. Provided that the average frequency is greater than the first threshold frequency, the charge on the integrator capacitor continues to rise until the voltage reaches a maximum level Analogously, starting from a fully charged state of the integrator capacitor—or any state which is higher than the first predetermined voltage level—in the case that the charging time is smaller than the discharging time, which case corresponds to the converter frequency being lower than the threshold frequency, the voltage on the integrator capacitor will decrease over time. Once the voltage on the capacitor reaches the second predetermined level, the PFC will be disabled.

It will be appreciated that the signals described above may be inverted, and a discharging of the capacitor be used to enable the PFC whereas charging is used disable it.

In embodiments, as shown on FIG. 2, the control circuit may optionally include further circuitry in order to respond to a step change in the load. In such embodiments, the integrator may be "forced" in the event that there is a particularly large step change in the load, corresponding to a step change in the power control signal 205. This circuitry includes a Schmitt trigger 260, and AND logic 250. The Schmitt trigger 260 compares instantaneous changes in the power control signal 205 with a reference level (Vstep). If the Schmitt trigger senses that the power control signal 205 which is greater than the reference level Vstep, its output goes high. It will be appreciated, that for correct operation the output of the comparator (260) should have priority compared to the RS latch output (270), and thus the Schmitt trigger acting as a comparator to determine a significant or step change in frequency takes priority over the frequency averaging arrangement. Absent such a step change detector, several switching cycles would be required before the charge on the integrator capacitor became sufficiently high to enable the PFC by means of the averaging technique. The predetermined level at which the Schmitt trigger triggers (that is to say, the value of Vstep) should be sufficiently so that it does not trigger merely due to noise on the power control signal 205. This imposes a minimum noise-margin between the voltage Vstep at which the Schmitt trigger triggers, and the average voltage (when corrected for noise) of the power control signal which corresponds to the average driver signal at which the PFC is enabled.

It will be noted that the timer is set to detect one frequency which corresponds to a period of $\phi 1+\phi 2$. In order to provide a hysteresis between the PFC-on and PFC-off frequencies, the value of $\phi 1$ must be changed. So the timer must know the state of the PFC (that is to say, whether it is on or off) in order to know which frequency must be detected (then which $\phi 1$ must be set)

Figure 4:
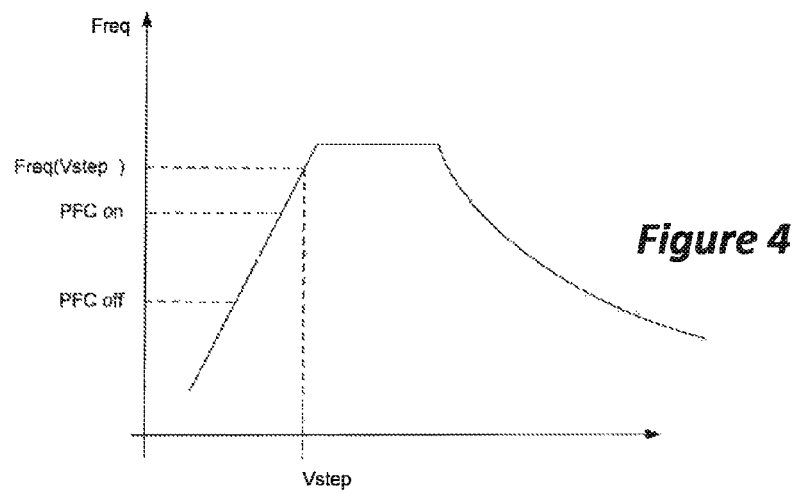
FIG. 4 is a curve showing the relationship between switching frequency and the voltage at a sense pin on the control IC.

Operation of the step change detector will now be described in more detail with reference to FIG. 4. This figure is a curve showing a relationship between switching frequency and the voltage at a sense pin on the control IC, that is to say, the power control signal, in an idealised environment where there is no bifurcation of the frequency for specific values of the power control signal.

The figure includes a linear region at which the power control signal increases with the switching frequency. A first level of required power, and thus of switching frequency, which corresponds to the enabling of the PFC stage is shown at "PFC on" and a second level required power, and thus of switching frequency, which corresponds to the disabling of the PFC stage is shown at "PFC off". The figure shows a value, Vstep, of the power control signal and its corresponding frequency Freq(Vstep), which it is an unambiguously clear that the PFC should be switched on. By unambiguously clear, is meant that there is no possibility that the power control signal has momentarily reached this level due to noise on the signal. That's the power control signal the step must exceed the average power control signal at which the PFC would otherwise be enabled by a predetermined noise margin.

In other words, the output power of the converter has a linear dependency to the converter frequency. If PowerOn is the power where the PFC is enabled, and "Fp" the transfer function power/frequency, then PFC-on=AVG(Fp(PowerOn)). There is also a transfer function between the voltage of the power control signal, shown as pin 3 in FIG. 2, and the converter frequency called "Fv". Vstep is defined such that Fv(Vstep)>Max(Fp(PowerOn)). As the frequency is not stable, the step voltage must be defined high enough to make sure that the overrule system does not take precedence over the frequency measuring system.

It will also be immediately apparent that the step change detector just described does not detect and operate in response to a predetermined size of step. Rather, it operates on the principle that if the load reaches a specific level corresponding to Vstep, it must be high enough to require that the PFC stage should be enabled. A high value on the power control signal (greater than Vstep), indicates that the PFC should be enabled: if the PFC was previously disabled, this must correspond to a step-change (increase) in the load in response to which the PFC is to be enabled.

The operation of an example integrator 240 which is used in embodiments, will now be described in more detail, with reference to FIG. 3. FIG. 3 shows, at FIG. 3(*a*) timing diagrams 330 and 340 of a gate driver (215 in FIG. 2) and a timer (230 in FIG. 2), and at FIG. 3(*b*) an integrator circuit.

Figure 3B:
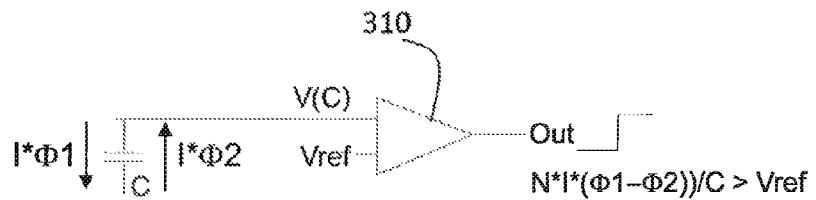
FIG. 3 shows, at FIG. 3(a) timing diagrams of a gate driver and a PFC timer, and at FIG. 3(b) an integrator circuit.
Figure 3A:
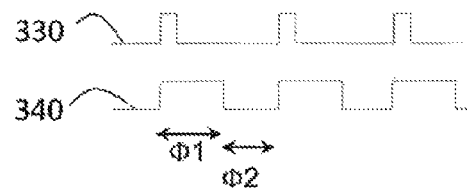

As shown at FIG. 3(*a*), the signal output from PFC timer 230 goes high or is enabled at the rising edge of the controller signal, also known as the gate driver signal, 215. The timer signal remains high for a time φ1 which corresponds to half of a threshold period. Once the timer reaches the end of this time φ1, the timer signal goes low, and remains low for a further time φ2 until it is forced high again by the subsequent rising edge of the controller signal 215. Thus, if the period of the controller signal (corresponding to the inverse of the switching frequency) is greater than the threshold period, φ2 is longer than φ1; conversely, if the period of the controller signal (corresponding to the inverse of the switching frequency) is greater than the threshold period, φ2 is shorter than φ1.

As shown at FIG. 3(*b*), the integrator comprises a capacitor C, which may be charged or discharged with current I. The voltage across the capacitor (V(C)) is provided as one input of a comparator 310; at the other input is provided a reference value Vref, which depends on the state (enabled or disabled) of the PFC. The output of the integrator provides the PFC on-off signal, to either enable or disable the PFC.

Starting from an initial state, in which the PFC is disabled, during the first time φ1, the capacitor C is charged with a current I. During the second time φ2, the capacitor C is discharged by the same current I. If the converter frequency is lower than the threshold frequency, φ1<φ2 and the voltage V(C) at the first comparator input rises to I*φ1/C and then returns back to its original level before the end of converter switching period (and will continue to fall either until the first of the end of the converter switching period, or until it is fully discharged); or, if the converter frequency is higher than the threshold frequency, φ1>φ2 and the voltage V(C) at the first comparator input rises to I*φ1/C but does not fall back to 0 by the end of the converter switching period, rather it only falls back to a value of I*(φ1−φ2)/C. Assuming, for the moment, a constant converter frequency which is greater than the threshold frequency, the voltage V(C) increases by I*(φ1−φ2)/C for each cycle, so after N cycles, the voltage is N*I*(φ1−φ2)/C. If the frequency is not constant but changes over time, then it is possible that for some periods, φ1>φ2 and there is increase in the voltage across the integrator capacitor, whilst for other periods φ1<φ2 and there is a decrease in the voltage on the integrator capacitor; however, provided that on average, or overall or on balance, the converter frequency is greater than the threshold frequency, then over time the voltage across the capacitor will increase Once the condition is reached that the voltage across the capacitor exceeds the reference voltage Vref (which for the constant converter frequency corresponds to the condition $$N*I*(\phi1-\phi2)/C>Vref),$$

the output from comparator 310 goes high. The PFC is thereby enabled.

Similarly, the integrator 230 can disable the PFC, starting from the initial conditions in which the PFC is enabled: In this case, the first time φ1 corresponds to half a second threshold period, the second threshold period being the inverse of a second threshold frequency, which frequency corresponds to the frequency at which the PFC should be disabled.

During the second time φ2, the capacitor C is discharged by the current I and during the subsequent first time φ1, the capacitor C is recharged with the same current I. If the converter frequency is higher than the threshold frequency, φ2<φ1 and the voltage V(C) at the first comparator input falls by I*φ2/C and then returns back to its original level before the end of the subsequent time φ1 (and continues to charge, until the first of it becomes fully charged, typically at a supply voltage Vdd, and the end of the time φ1); conversely, if the converter frequency is lower than the threshold frequency, φ2>φ1 and the capacitor is discharged more than it is recharged. Again assuming, for the moment, a constant converter frequency which is less than the threshold frequency, the voltage V(C) decreases by I*(φ2−φ1)/C for each cycle, so after N cycles, the voltage is: (Vdd−N*I*(φ2−φ1)/C).

Once the condition is reached:

$$(Vdd-N*I*(\phi2-\phi1)/C)<Vref,$$

the output from comparator 310 goes low and the PFC is thereby disabled. Provided the converter frequency remains less than the threshold frequency, the voltage across the capacitor continues to fall until the capacitor is fully discharged.

Embodiments described above have been described with reference to the period of the switching and specifically with reference to times φ2 and φ1. Since the switching period is the inverse of the switching frequency, enabling/disabling the PFC is in response to the switching frequency; it may even be considered to be in direct response the switching frequency. This is in contrast with conventional controllers, in which the enabling/disabling is not "in response to the switching frequency", but rather is in response to a control signal from which the switching frequency is also controlled. Though in such conventional systems there is a correlation between the control signal and the switching frequency, enabling/disabling of the PFC is not in response to the switching frequency.

In other embodiments, the enabling/disabling of the PFC may be directly related to the converter frequency (rather than inversely, as is the case in the embodiments described above); for instance, the system may take them time domain signal and convert this to the frequency domain by means of a fast fourier transform or the like, and then directly compare frequencies.

As the skilled person will appreciate, in embodiments, the actual instantaneous operating frequency, corresponding to the load factor of the converter, is not the primary control variable for enabling disabling the PFC, and thus discrepancies on the load factors between convert controllers are overcome. Moreover the enabling and disabling of the PFC depends directly on the frequency of the converter—or more specifically the average of the frequency of the converter—rather than on the command from which the converter control frequency is established, thus resulting in greater robustness with respect to noise.

It will be further appreciated that any one of a variety of control variables may be used to control a PFC stage in an AC/DC converter. These include peak current, on time, and frequency. Embodiments of the invention may extend to any such AC/DC converters, provided only that the power is dependent on the operating frequency, such as is commonly the case for converters operating in continuous control mode (CCM), boundary control mode (BCM), with or without valley switching and with or without valley skipping, and even in discontinuous control mode (DCM).

Furthermore, it will be appreciated that although the embodiments of the above have been described with respect to a separate PFC stage, the invention is not limited thereto, and extends to single-stage AC/DC converters in which the PFC functionality is embedded within the single stage, and to multistage AC/DC converters in which the PFC functionality is embedded within one of the stages, provided only that the PFC functionality may be enabled or disabled, independent of the switch mode power converter function.

In summary, from one perspective, herein a method of controller an AC/DC to converter is disclosed, the converter having a power factor correction stage and a signal indicative of a required power and operating with a switching cycle having a switching frequency being the inverse of a switching period. The method comprises switching on the PFC stage, in response to a signal indicative of an average switching frequency rising above a first threshold. The method further comprises switching off the PFC stage, in response to the signal indicative of an average switching frequency falling below a second threshold. The method may further comprise switching on the PFC stage, in response to a positive step change in the signal indicative of a required power, and switching off the PFC stage, in response to indicative step change in the signal indicative of a required power. A controller and an AC/DC converter operable according to such a method are also disclosed as is an LED lighting system comprising such a controller.

From reading the present disclosure, other variations and modifications will be apparent to the skilled person. Such variations and modifications may involve equivalent and other features which are already known in the art of AC/DC, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of controlling an AC/DC converter, the converter having a power factor correction stage and a signal indicative of a required power and operating with a switching cycle having a switching frequency being the inverse of a switching period, the method comprising:
   enabling the PFC stage, in response to a signal indicative of an average switching frequency crossing a first threshold; and
   disabling the PFC stage, in response to the signal indicative of an average switching frequency oppositely crossing a second threshold; and
   enabling the PFC stage, in response to the signal indicative of a required power exceeding a predetermined level.

2. The method of claim 1, wherein the second threshold is different from the first threshold.

3. The method of claim 1, comprising a Schmitt trigger configured to determine whether the signal indicative of a required power exceeds the predetermined level.

4. The method of claim 1, wherein the predetermined level is greater than the value of the signal indicated of a required power corresponding to the first threshold by a predetermined noise margin level.

5. The method of claim 1, wherein the PFC stage is a separate stage in the AC/DC converter.

6. The method of claim 1, wherein the AC/DC converter is a flyback converter.

7. A method of controlling an AC/DC converter, the converter having a power factor correction stage and a signal indicative of a required power and operating with a switching cycle having a switching frequency being the inverse of a switching period, the method comprising:
   enabling the PFC stage, in response to a signal indicative of an average switching frequency crossing a first threshold; and
   disabling the PFC stage, in response to the signal indicative of an average switching frequency oppositely crossing a second threshold; and
   wherein the signal indicative of an average switching frequency is proportional to a sum, over a plurality of switching cycles, of the difference between the switching period of that switching cycle and a reference period.

8. The method of claim 7, wherein the signal indicative of an average switching frequency is the voltage across a capacitor, which, for each switching period, is charged at a predetermined charge rate for half the reference period, and discharged at the predetermined rate for the remaining of the switching period.

9. A controller for a AC/DC converter,
   operable with a switching cycle having a switching frequency being the inverse of a switching period,
   the controller comprising:
   a switchable PFC stage,
   wherein the controller is configured to enable the PFC stage, in response to a signal indicative of an average switching frequency crossing a first threshold; and to disable the PFC stage, in response to the signal indicative of an average switching frequency oppositely crossing a second threshold; and
   wherein the controller is further configured to enable the PFC stage, in response to the signal indicative of a required power exceeding a first predetermined level.

10. The controller for an AC/DC converter as claimed in claim 9, further comprising a Schmitt Trigger configured to determine whether the signal indicative of a required power exceeds the predetermined level.

11. The controller for an AC/DC converter as claimed in claim 9, comprising a timer, and an integrator configured to output the signal indicative of an average switching frequency.

12. The controller for an AC/DC converter as claimed in claim 10, wherein the integrator comprises a capacitor, configured to, in use during a switching cycle, be charged with a current for half a reference period, and be discharged with that current for the remainder of the switching period of that switching cycle.

13. An LED lighting system comprising an AD/DC convertor comprising a controller, the controller comprising:
   a switchable PFC stage,
   wherein the controller is configured to enable the PFC stage, in response to a signal indicative of an average switching frequency crossing a first threshold; and to disable the PFC stage, in response to the signal indicative of an average switching frequency oppositely crossing a second threshold; and wherein the controller is further configured to enable the PFC stage, in response to the signal indicative of a required power exceeding a first predetermined level.

* * * * *